United States Patent [19]

Baldridge

[11] Patent Number: 4,995,457
[45] Date of Patent: Feb. 26, 1991

[54] LIFT-THROUGH HEAD AND SWIVEL
[75] Inventor: Morris G. Baldridge, Duncan, Okla.
[73] Assignee: Halliburton Company, Duncan, Okla.
[21] Appl. No.: 444,657
[22] Filed: Dec. 1, 1989
[51] Int. Cl.⁵ .................. E21B 33/05; E21B 33/16
[52] U.S. Cl. .................... 166/70; 15/104.062; 285/93; 285/281; 285/94; 166/113
[58] Field of Search .............. 166/70, 78, 79, 85, 166/75.1, 383, 153, 156, 90, 113; 15/104.061, 104.062, 104.063, 104.16; 285/281, 276, 278, 93, 94

[56] References Cited

U.S. PATENT DOCUMENTS

| | | | |
|---|---|---|---|
| 2,029,598 | 2/1936 | Timbs et al. | 285/281 X |
| 2,196,652 | 4/1940 | Baker | 166/156 |
| 2,630,179 | 3/1953 | Brown | 166/291 |
| 2,647,582 | 8/1953 | Brown et al. | 166/70 |
| 3,322,197 | 5/1967 | Baker et al. | 166/70 X |
| 3,616,850 | 11/1971 | Scott | 166/155 |
| 3,777,819 | 12/1973 | Delano | 166/285 |
| 3,779,270 | 12/1973 | Davis | 15/104.062 X |
| 3,971,436 | 7/1976 | Lee | 166/70 X |
| 4,234,216 | 11/1980 | Swanson et al. | 285/93 |
| 4,246,967 | 1/1981 | Harris | 166/291 |
| 4,290,482 | 9/1981 | Brisco | 166/70 |
| 4,302,033 | 11/1981 | Evans et al. | 285/93 X |
| 4,624,312 | 11/1986 | McMullin | 166/155 |
| 4,655,462 | 4/1987 | Balsells | 277/164 |
| 4,678,210 | 7/1987 | Balsells | 285/318 |
| 4,804,290 | 2/1989 | Balsells | 403/326 |

OTHER PUBLICATIONS

Exhibit A–Drawing of a cement head apparatus sold by Nodeco.
Exhibit B–Advertising brochure of Halliburton Company, 7-15-81.
Exhibit C–Two drawings of cementing head apparatus.
Exhibit D–1982-83 Composite Catalog of Oilfield Equipment & Services, vol. 1, pp. 182 and 1293.
Exhibit F–Advertisement for rotary drilling swivel manufactured by Gray Tool Company (no publishing date given).
Exhibit G–Advertising brochure for Roto-Tek cementing system, (no publishing date given).
Exhibit H–Advertisement for a cementing manifold sold by Lindsey Completion Systems, (no publication date given).
Exhibit I–Drawing of typical prior art casing swivel used for non-lift-through applications, (no publishing date given).
Exhibit J–Photocopy of swivel previously used by assignee of present invention.

Primary Examiner—Stephen J. Novosad
Attorney, Agent, or Firm—James R. Duzan; L. Wayne Beavers

[57] ABSTRACT

A cementing head apparatus includes a container body having a body bore therethrough. Upper and lower releasing mechanisms are associated with the container body. The lower releasing mechanism has a cylindrical plunger extending into a bore of the container body. A spherical releasing ball rests upon the plunger of the lower releasing mechanism. The upper releasing mechanism is identically constructed and is associated with a releasing dart. Upper and lower ends of the container body have complementary male and female straight threads with associated O-ring seals defined therein. A lifting sub is directly connected to the upper thread and has a loading bore defined therethrough. A cap closes an upper end of the loading bore of the lifting sub. A swivel is directly connected to the straight thread at the lower end of the container body.

16 Claims, 2 Drawing Sheets

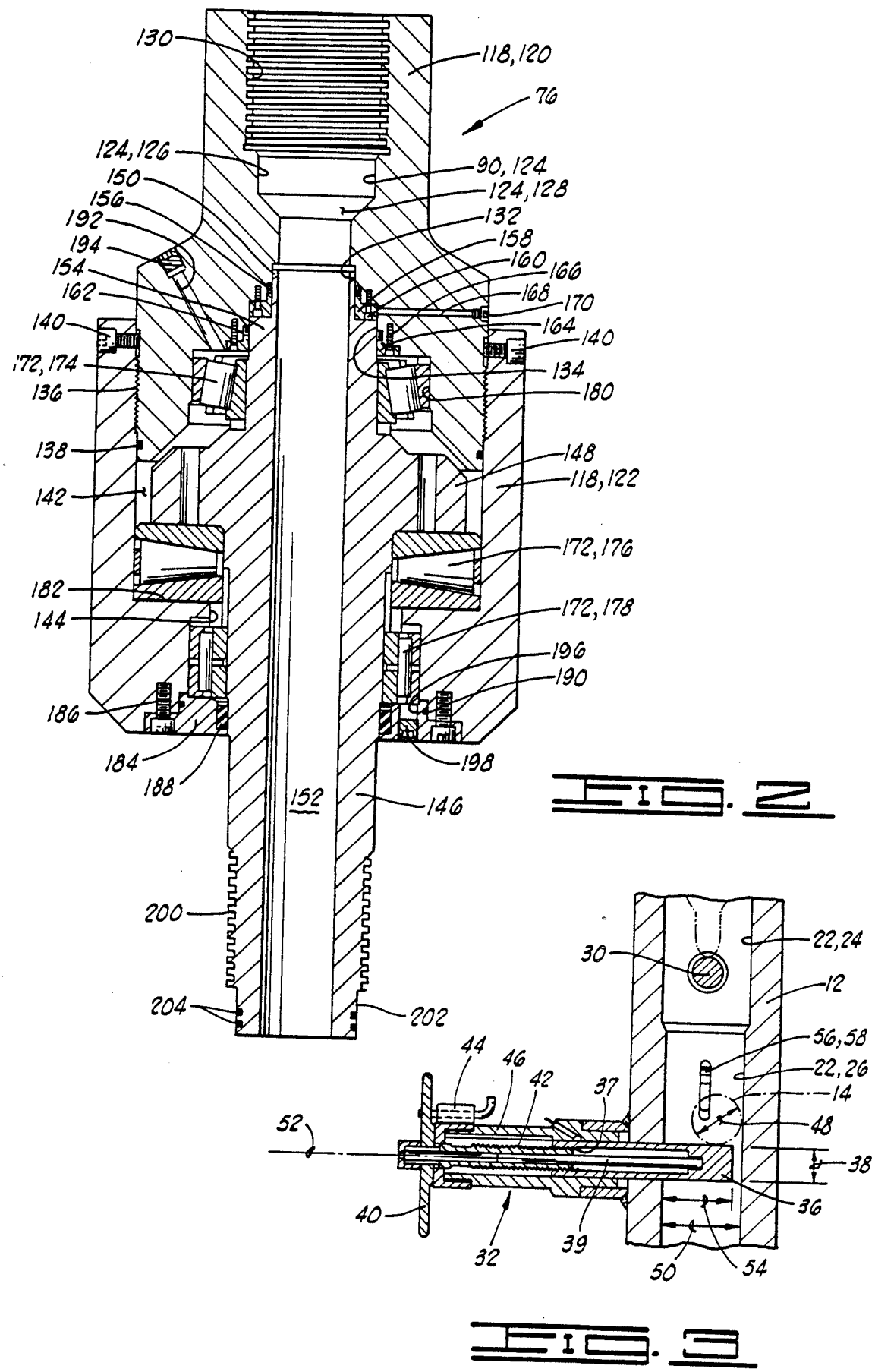

LIFT-THROUGH HEAD AND SWIVEL

BACKGROUND OF THE INVENTION

1. Field Of The Invention

The present invention relates to a cementing head apparatus, and more particularly to containers for releasing balls and darts, and to associated swivels for permitting rotation during the cementing operation.

2. Description Of The Prior Art

One type of cementing system which is commonly used in the completion of offshore wells is that known as a subsurface release cementing system. In a subsurface release cementing system, the cement plugs themselves are hung off in the upper end of the casing near the ocean floor. Devices such as balls and darts are released from a plug container or cementing head located at the floating drilling rig. The balls or darts fall downward through drill pipe to engage the cementing plugs hung off in the casing head, and to cause those cementing plugs to be released and to then flow down through the casing with the cement.

One such system is shown in U.S. Pat. No. 4,624,312 to McMullin, assigned to the assignee of the present invention.

Another such system is shown in U.S. Pat. No. 3,616,850 to Scott. As shown in the Scott patent, the devices launched from the upper head to engage and release the cementing plugs typically include a ball for releasing the bottom cementing plug and a dart for releasing the top cementing plug.

It is also known to construct the cementing head in what is known as a "lift-through" design, wherein the entire weight of the drill pipe which is hung below the drilling platform is supported through or lifted through the structure of the cementing head. One such system is that known as the Nodeco system which is shown in Exhibit A filed herewith. The Nodeco system utilizes a lifting sub having a loading bore defined therethrough and having an upper cap with a rod extending downward therefrom and extending through the loading bore. The Nodeco system also utilizes a swivel below the cementing head.

Various designs of heavy-duty swivels are also known to the art. One example is the Bowen workover swivel manufactured by Bowen Tools, Inc., of Houston, Texas, as shown at page 1293 of Volume 1 of the 1982-83 *Composite Catalog of Oilfield Equipment and Services*. The Bowen swivel includes three bearings operating in an oil bath.

SUMMARY OF THE INVENTION

The present invention provides an improved lift-through type cementing head and heavy-duty swivel for use with a subsurface release cement plug system. The invention is particularly adapted for carrying very heavy loads while continuously rotating the drill pipe and/or casing supported from the cementing head.

The cementing head is designed to utilize a spherical releasing ball for releasing the bottom cementing plug, and an elongated dart for releasing the top cementing plug. The plunger system for releasing the spherical ball and the dart have been improved, particularly with regard to the release mechanism for the spherical ball.

A heavy-duty swivel capable of continuous rotation while supporting very high loads is also provided. The connections to the cementing head are designed to permit stacking of cementing heads, and to permit connection of the swivel to a lowermost one of the cementing heads.

With regard to the release mechanism for the spherical ball, the cementing head has a container body having a cylindrical body bore defined therethrough, with the body bore having a first bore portion with a first inside diameter. A first cylindrical release plunger is operably associated with the container body and is movable between a first position wherein the plunger extends into the first portion of the body bore and the second position wherein the plunger is withdrawn from the body bore. The cylindrical plunger has a plunger outside diameter. A spherical releasing ball is located above and initially engages the plunger when the plunger is in its first position. The ball has a ball diameter greater than one-half of a difference between the first inside diameter of the container body bore and the plunger outside diameter so that when the plunger is in its first position the ball is prevented from moving downward through the body bore past the plunger, and so that when the plunger is withdrawn to its second position the ball is permitted to drop through the body bore. This is contrasted to prior art devices wherein the releasing ball is typically held outside the body bore, and the release mechanism must first be extended into the body bore to drop the ball, and then retrieved from the body bore to prevent interference with subsequent release of the dart located above the releasing ball.

With regard to the assembly of the cementing head and swivel, the container body has upper and lower ends with the body bore extending from the upper end to the lower end. The container body has a first straight thread and a first O-ring seal at the upper end and has a second straight thread and a second O-ring seal at its lower end. A lifting sub is directly connected to the upper end of the container body at the first thread with the first O-ring seal sealing between the lifting sub and the body. The lifting sub has a loading bore therethrough communicated with the body bore. A cap closes an upper end of the loading bore of the lifting sub. The swivel is directly connected to the lower end of the body at the second thread with the second O-ring seal sealing between the container body and the swivel.

With regard to improvements in the swivel itself, the swivel includes a swivel body having an upper body portion and a lower body portion. The upper swivel body portion has a body flow passage defined therethrough and has a downward facing first counterbore adjacent the body flow passage. The lower swivel body portion is connected to the upper swivel body portion so that a body cavity is defined therebetween. The lower swivel body portion has a lower opening defined therethrough.

A swivel mandrel extends through the lower opening of the lower body portion and has an enlarged diameter mandrel shoulder received in the body cavity. The mandrel has an upper end closely received within the first counterbore of the upper swivel body portion. The swivel mandrel has a mandrel flow passage defined therethrough and communicated with the body flow passage.

Bearing means are disposed in the body cavity between the swivel body and the swivel mandrel. First and second seal means are disposed between the upper body portion and the upper end of the swivel mandrel for sealing between the body cavity and the flow passages and for preventing contamination of an oil lubricating bath in the body cavity by fluids in the flow passage. An inspection passage means is defined in the upper swivel body portion for detecting failure of either of the first and second seal means.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 2 is an enlarged elevation section view of the swivel.

FIG. 3 is an elevation section view taken along line 3—3 of FIG. 1 showing an enlarged detail of the release plunger for the spherical releasing ball.

DETAILED DESCRIPTION OF THE PREFERRED EMBODIMENTS

Figure 1:
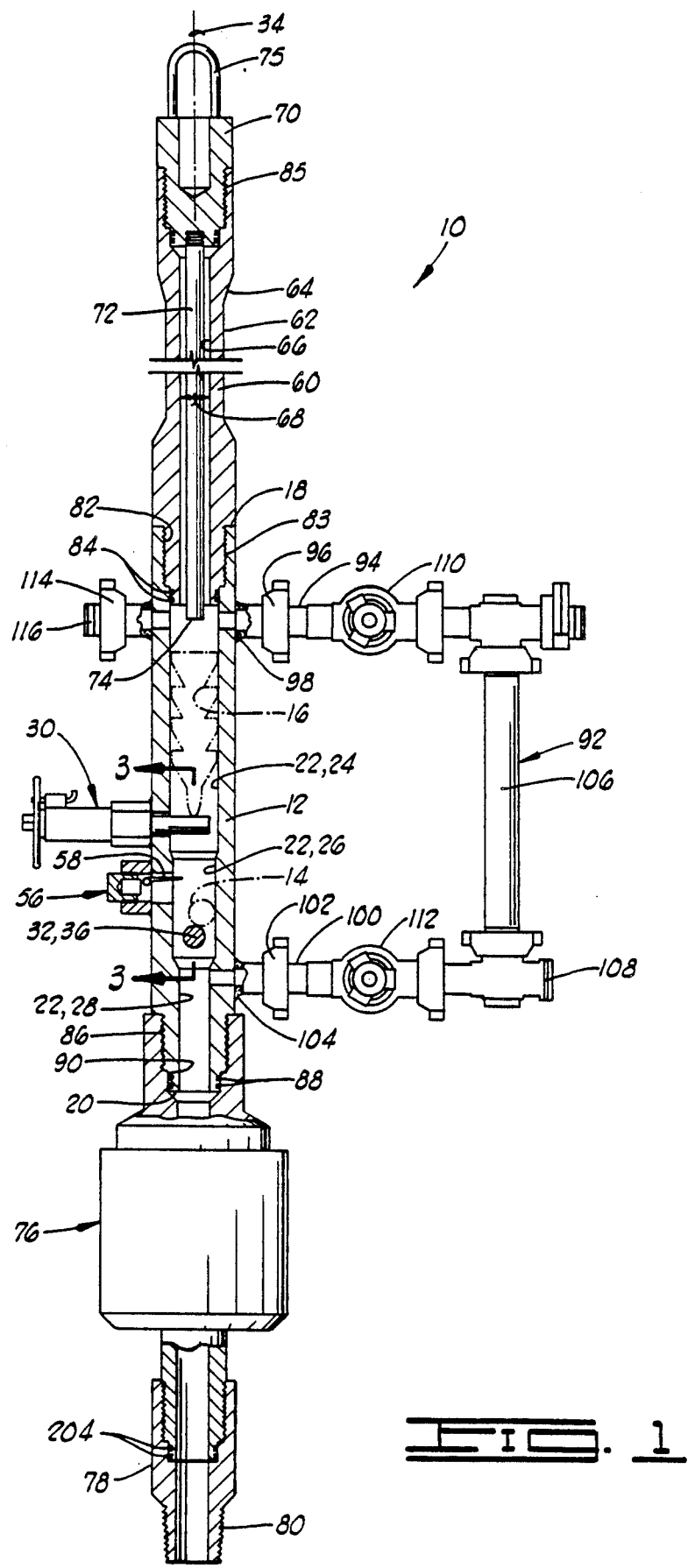
FIG. 1 is an elevation section view of the cementing head of the present invention including a swivel and an adapter connected to the lower end of the swivel for connection thereof to a string of drill pipe.

Referring now to the drawings, and particularly to FIG. 1, a cementing head apparatus is thereshown and generally designated by the numeral 10. The apparatus 10 includes a container body 12 which initially contains a spherical releasing ball shown in phantom lines as 14, and an elongated releasing dart shown in phantom lines as 16. As will be understood by those skilled in the art, the ball 14 and dart 16 are selectively released and allowed to flow downward through a pipe string to engage bottom and top cementing plugs, respectively, which are releasably held in a lower portion of the well.

The container body 12 has an upper end 18 and a lower end 20. A cylindrical body bore 22 is disposed therethrough from the upper end 18 to the lower end 20. The body bore 22 includes an upper larger diameter portion 24, an intermediate reduced diameter portion 26, and a lower further reduced diameter portion 28.

The cementing head apparatus 10 includes an upper releasing assembly 30 and a lower releasing assembly 32 associated with the dart 16 and the releasing ball 14, respectively. The upper releasing assembly 30 is seen in elevation section view in FIG. 1. Only a sectioned end of the plunger of the lower releasing mechanism 32 is seen in FIG. 1. The lower releasing mechanism 32 is seen in elevation sectioned view in FIG. 3 which is taken along line 3—3 of FIG. 1. As is apparent from FIGS. 1 and 3, the releasing mechanisms 30 and 32 are radially spaced by an angle of 90° about the longitudinal axis 34 of the cement head apparatus 10.

The details of construction of the upper and lower releasing mechanisms 30 and 32 are substantially identical. Those details will be described with regard to the enlarged view of the lower releasing apparatus 32 shown in FIG. 3.

The releasing apparatus 32 includes a cylindrical release plunger 36 operably associated with the container body 12 and movable between a first position as shown in FIG. 3 wherein the plunger 36 extends into the intermediate portion 26 of body bore 22 and a second position (not shown) wherein the plunger 36 is completely withdrawn from the body bore 22. The cylindrical plunger 36 has an outside diameter 38 indicated in FIG. 3. A hand wheel 40 is rotated to cause the hollow cylindrical plunger 36 to move radially along a thread 42 of a shaft attached to handle 40. Hollow plunger 36 has an internal thread 37 and a centering shaft 39. A locking means 44 releasably latches the handle 40 in place. As the handle 40 is rotated, the plunger 36 withdraws into a hollow body 46 of the releasing mechanism due to the engagement of threads 37 and 42.

Although the releasing mechanisms like mechanisms 30 and 32 have been used in the part, they have previously been used either to hold a cement plug itself as shown in Brisco U.S. Pat. No. 4,290,482, or to contain releasing darts in a cementing head associated with a subsurface release cementing plug system as shown for example in U.S. Pat. No. 4,624,312 to McMullin.

The present invention, however, uses a simple cylindrical release plunger like that just described to selectively release the spherical releasing ball 14. Previously, much more complex releasing mechanisms have been necessary for use with releasing balls. Such mechanisms typically included a spoon or ring which held the ball in a cavity offset from the bore of the cementing head. To release the ball, the releasing mechanism first had to be extended into the body bore of the cementing head to release the ball, and then the releasing mechanism had to be retracted to clear the body bore. Such mechanisms have presented a difficulty in that operators will sometimes fail to retract the mechanism after the releasing ball has been dropped. Subsequently, when the upper releasing dart is dropped by the upper releasing mechanism, it will hang up on the unretracted releasing mechanism for the releasing ball. An example of such a typical prior art type releasing mechanism for a spherical ball is shown in U.S. Pat. No. 3,616,850 to Scott.

With the present invention, the spherical ball 14 is dimensioned so that when the plunger 36 is extended into the body bore 22, 26, the releasing ball 14 will be located above and will engage the plunger 36. This is accomplished by constructing the releasing ball 14 with a ball diameter 48 greater than one-half of a difference between an inside diameter 50 of intermediate portion 26 of body bore 22 and the plunger outside diameter 38 so that when the plunger 36 is in its first position as illustrated in FIG. 3, the spherical ball 14 is prevented from moving downward through the body bore 22 past the plunger 36. When the plunger 36 is subsequently retracted from the body bore 22, 26, the spherical ball 14 is permitted to drop through the body bore 22, 26.

The upper releasing mechanism 30 associated with the releasing dart 16 is substantially identically constructed. Thus, identical actions of the human operator are required for releasing both the spherical releasing ball 14 and the releasing dart 16. The human operator need only withdraw the plungers associated with the mechanisms 32 and 30 to release the spherical ball 14 and the dart 16, respectively. This is contrasted to prior art systems such as that of Scott U.S. Pat. No. 3,616,850 where different operating actions are required to release the ball and the dart. With the system of the present invention it is impossible for the human operator to mistakenly leave the lower release mechanism in a position where it will interfere with movement of the dart 16 upon actuation of the upper release mechanism 30.

Preferably, the plunger 36 of lower release mechanism 32 has a central axis 52 thereof extending along a radius of a horizontal cross section of the body bore 22, and when the plunger 36 is in its extended first position, the plunger 36 extends radially into the body bore 22, 26 a distance 54 greater than a difference between inside diameter 50 and the ball diameter 48.

An indicator mechanism 56 is mounted on container body 12 between the upper and lower release mechanisms 30 and 32. The indicator mechanism 56 has a trip lever 58 extending into the body bore 22 which will trip when the dart 16 passes downward through the body bore 22 to provide an indication that the dart 16 has released.

Returning to FIG. 1, the cement head apparatus 10 also includes a lifting sub 60 connected to the upper end 18 of container body 12. The lifting sub 60 has a reduced diameter external surface 62 and a downward facing tapered shoulder 64 about which a conventional pair of elevator bails (not shown) of a drilling rig are placed in order to lift the lifting sub 60 and the various apparatus suspended therefrom as further described below.

The lifting sub 60 has a loading bore 66 defined therethrough which is communicated with the body bore 22 of container body 12. The loading bore 66 has an inside diameter 68 greater than the diameter 48 of releasing ball 14 so that the releasing ball 14 can pass downward through loading bore 66. The releasing dart 16 can also pass downward through the loading bore 66. As will be understood by those skilled in the art, the larger diameter wiper cups of releasing dart 16 are very flexible and can be compressed so that the dart 16 can be pushed downward through the loading bore 66.

An upper cap 70 is detachably connected to the upper end of the lifting sub 60 for closing the loading bore 66. The cap 70 has a rod 72 extending downward therefrom through the loading bore 66. The rod 72 serves two purposes. First, it is utilized to push the releasing dart 16 down through the loading bore 66. Second, a lower end 74 of rod 72 extends downward into the body bore 22 to prevent the dart 16 from floating upward far enough to cause any operational difficulties during the cementing job.

The upper cap 70 has a handle loop 75 attached thereto for handling of the cap 70 and pin 72.

A swivel 76 is connected to the lower end of container body 12. An adapter 78 is connected to the lower end of swivel 76 and has a standard tapered threaded pin connection 80 defined thereon for connection to a string of drill pipe (not shown) suspended therefrom.

The upper end of container body 12 has a first straight female thread 82 defined therein which is directly connected to a complementary straight thread 83 of the lifting sub 60, with a pair of O-ring seals 84 being placed in external grooves of the lifting sub 60 to seal within the upper portion 24 of body bore 22.

It is noted that a threaded connection 85 between the upper end of lifting sub 60 and cap 70 is identical to the threaded connection 82, 83 at the lower end of lifting sub 60. Thus the lifting sub 60 and rod 72 can be eliminated and cap 70 can be connected directly to the upper end of container body 12.

The lower end of container body 12 has a second straight male thread 86 defined thereon which is directly connected to the swivel 76. A pair of O-ring seals 88 are placed in external grooves of the lower end portions of container body 12 and seal within an internal bore 90 of swivel 76. The threads 82 and 86 are complementary. For example, for a cementing head apparatus 10 constructed to be utilized with 5½ inch nominal diameter drill pipe connected to the adapter 78, the threads 82 and 86 preferably are 6 1/16 inch 4-Acme left-hand thread.

The use of complementary threads 82 and 86 on the upper and lower ends of the container body 12 allows a plurality of identical container bodies 12 to be stacked if so desired. The lifting sub 60 can then be connected to the upper end of the uppermost one of the stacked container bodies 12, and the swivel 76 can be connected to the lower end of the lowermost one of the stacked container bodies 12.

The cementing head apparatus 10 also includes a cementing manifold generally designated by the numeral 92 which is connected to the container body 12. The cementing manifold includes an upper cementing line 94 which is connected to container body 12 by a first hammer union 96 which is welded to container body 12 as indicated at 98. Manifold 92 similarly includes a lower cementing line 100 connected to container body 12 by a second hammer union 102 welded to container body 12 as indicated at 104. The upper and lower cementing lines 94 and 96 are communicated by a vertical conduit 106. Cement and other fluids will be provided to the cementing manifold 92 at an inlet 108. Valves 110 and 112 are disposed in the upper and lower cementing lines 94 and 100, respectively.

A third hammer union 114 is welded to container body 12 diametrically opposite the union 96, and has a plug 116 contained therein.

As will be understood by those skilled in the art, the valves 110 and 112 are used to control the flow of cement and other fluids so that they can be selectively diverted either to the lower end of container body 12 prior to the release of dart 16, and then to the upper end of container body 12 after release of the dart 16.

Turning now to FIG. 2, the details of construction of the swivel 76 will be described. The swivel 76 includes a swivel body 118 made up of an upper body portion 120 and a lower body portion 122.

The upper body portion 118 has a body flow passage 124 defined therethrough which includes a main bore 126, an upper tapered bore 128, and the previously mentioned bore 90 within which the lower end of container body 12 is sealingly received. Above the bore 90, the upper body portion 120 has a straight internal thread 130 complementary to the straight external thread 86 of container body 12.

The upper swivel body portion 120 includes downward facing first and second counterbores 132 and 134 adjacent the flow passage 124.

The lower swivel body portion 122 is connected to the upper swivel body portion 120 at thread 136 with an O-ring seal 138 being provided therebetween. A plurality of screws 140 provide a locking means 140 for locking the upper and lower swivel body portions 120 and 122 together after they are threadedly connected.

The upper and lower swivel body portions 120 and 122 define a body cavity 142 therebetween. The lower swivel body portion 120 has a lower opening 144 defined therethrough which is communicated with the body cavity 142.

The swivel 76 includes a swivel mandrel 146 extending through the lower opening 144 of lower swivel body portion 122 and having an enlarged diameter mandrel shoulder 148 defined thereon and received in the body cavity 142.

The swivel mandrel 146 has an upper end portion 150 closely received within the first counterbore 132 of upper swivel body portion 120.

The swivel mandrel 146 has a mandrel flow passage 152 defined therethrough which is communicated with the body flow passage 124.

An enlarged diameter second portion 154 of swivel mandrel 146 is closely received within the second counterbore 134 of upper swivel body portion 120.

A first seal means 156, which may also be referred to as primary seal 156, is disposed between upper end portion 150 of swivel mandrel 146 and the first counterbore 132 of upper swivel body portion 120. Seal 156 is a mechanical spring energized seal and is held in place by a primary seal retainer ring 158 which is attached to upper swivel body portion 120 by a plurality of screws 160.

A second seal means 162 which is also a mechanical spring energized seal is provided between the enlarged diameter portion 154 of swivel mandrel 146 and the second counterbore 134 of upper swivel body portion 120. Second seal means 162, which may also be referred to as a secondary seal 162, is held in place by a secondary seal retainer ring 164 which is attached by a plurality of screws 166.

The primary seal 156 and secondary seal 162 both seal between the body cavity 142 and the flow passages 124 and 152 for preventing contamination of an oil lubricating bath contained in body cavity 142 by fluids in the flow passages 124 and 152.

The upper swivel body portion 120 has an inspection passage means 168 defined therein which communicates with the second counterbore 134 between the primary and secondary seals 156 and 162 for detecting failure of either the primary seal 156 or secondary seal 162. The inspection passage means 168 has an outer end which is normally covered by a threaded plug 170. To inspect the seals 156 and 162, the plug 170 is removed to determine whether any fluid is seeping past the seal 156 or the seal 162. If either seal is leaking, the fluid can be detected in the inspection passage 168.

One preferred construction for the mechanical spring energized seals 156 and 162 which may be utilized with the present invention are seals known as Bal seals which can be obtained from Bal Seal Engineering Company, Inc., of Santa Ana, California. The details of construction of such seals are shown for example in U.S. Pat. Nos. 4,655,462; 4,678,210; and 4,804,290, the details of which are incorporated herein by reference.

The swivel 76 further includes a plurality of bearing means 172 disposed in the body cavity 142 between the swivel body 118 and the swivel mandrel 146. The bearing means 172 preferably includes three bearings, namely an upper thrust bearing 174, a lower thrust bearing 176, and an alignment bearing 178.

The upper thrust bearing 174 is mounted between the upper portion of swivel mandrel 146 and a third counterbore 180 of upper swivel body portion 120. The upper thrust bearing is a cup-type bearing and supports both compressional thrust type loads between upper swivel body portion 120 and swivel mandrel 146 and radial loads therebetween.

The lower thrust bearing 176 is mounted between the shoulder 148 of swivel mandrel 146, and an upward facing annular surface 182 of lower swivel body portion 122. It supports tensile axial loads between the swivel body 118 and the swivel mandrel 146.

The alignment bearing 178 is located between a lower portion of the swivel mandrel 146 and the opening 144 in lower swivel body portion 122. It is for the purpose of resisting radial loads therebetween and, thus maintaining the alignment between swivel mandrel 146 and swivel body 118.

A bearing and seal retainer ring 184 is received about the lower portion of swivel mandrel 146 and is attached to lower swivel body portion 122 by screws 186 thus closing the lower opening 144. A pair of stacked seals 188 are held by bearing and seal retainer ring 144 and provide a seal against the rotating outer surface of swivel mandrel 146. An O-ring seal 190 is provided between bearing and seal retainer ring 184 and the lower swivel body portion 122.

The upper swivel body portion 120 has an upper fill passage 192 defined therein which is normally closed by a threaded plug 194. The bearing and seal retainer ring 184 has a lower fill passage 196 defined therein which is normally closed by a threaded plug 198.

The body cavity 142 is filled with lubricating oil through the fill passages 192 and 196 to provide an oil lubricating bath for the bearings 174, 176 and 178.

The swivel mandrel 146 has a straight male thread 200 defined on the lower end thereof which is complementary to the straight female thread 130 at the upper end of swivel body 118. A reduced external diameter portion 202 carries a pair of O-ring seals 204 in external grooves. The thread 200, reduced diameter portion 202 and seals 204 of the lower end of swivel mandrel 146 are identical in dimension and construction to the thread 86 and the reduced diameter portion and seals 88 on the lower end of container body 12 shown in FIG. 1. Thus, if the swivel 76 is not utilized with the container body 12, the adapter 78 can be directly connected to the thread 86 on the lower end of container body 12.

OPERATION OF THE INVENTION

The cement head apparatus 10 including the swivel 76 has been particularly designed for use in offshore operations wherein very heavy loads must be suspended therefrom and wherein it is desirable to rotate the drill pipe and/or casing suspended below the swivel 76 for long periods of time while supporting very heavy loads. For example, an embodiment of the apparatus 10 constructed for use with 5½ inch nominal drill pipe is rated for 500 tons lift with a 10,000 psi internal pressure. The swivel 76 designed for use therewith is designed for rotating out of liner hangers while supporting drill pipe and can also be used for rotating liners while cementing. The swivel 76 is also rated for 500 tons static lift with a 10,000 psi internal pressure. Under continuous rotation the swivel 76 has a capacity of 266 tons at 15 rpm. This continuous rotation is accommodated by the use of the three bearings 174, 176 and 178 lubricated by the internal oil bath contained in swivel body cavity 142.

The mechanical spring energized seals 156 and 162 also are important in permitting the continuous rotation under the heavy loads described. Similarly, the inspection port 168 which permits inspection of these seals is important to safe operation of the swivel 76 under the heavy loads described.

Furthermore, the construction of container body 12 utilizing welded hammer unions 96 and 102 for line connections, thus eliminating any threaded connections to the container body 12 is important to the high pressure high load capacity design of the apparatus 10.

In use, the cement head apparatus 10 is supported with elevator bails received about the reduced diameter external surface 62 of lifting sub 60. Drill pipe is connected to the adapter 78 at threads 80, and the weight of the drill pipe and/or liner located therebelow is carried in tension by the cement head apparatus 10.

The releasing ball 14 and dart 16 may be loaded into the container body 12 by removing the upper cap 70 and loading the ball 14 and dart 16 through the loading bore 66 of lifting sub 60.

Then, cement is pumped into the container body 12 through lower cementing line 100 and the spherical ball 14 is released by retracting plunger 36 of lower releasing mechanism 32, so that the spherical ball 14 flows downward near the lower end of the cement slug.

As will be understood by those skilled in the art, the spherical ball 14 will seat in a bottom cementing plug (not shown) typically hung off in the casing adjacent the ocean floor. Once it seats, the bottom cementing plug will release and flow downward to define the lower face of the cement slug flowing down into the casing.

When sufficient cement has been pumped into the well to perform the cementing job, the releasing dart 16 will be released, and fluid will be diverted through the upper cementing line 94 so that the dart 16 flows downward. The dart 16 will subsequently seat in the top cementing plug causing it to release and flow downward with the cement slug adjacent the upper extremity of the cement slug.

During this entire cementing operation, the swivel 76 allows the drill pipe and/or liner hung off therebelow to be continuously rotated over extended periods of time.

While certain preferred embodiments of the invention have been illustrated and described for purposes of the present disclosure, numerous changes in the arrangement and construction of the invention may be made by those skilled in the art, which changes are encompassed within the scope and spirit of the present invention.

What is claimed is:

1. A cementing head apparatus, comprising:
   a container body having a generally cylindrical body bore defined therethrough, said body bore having an inside diameter;
   a first cylindrical release plunger operably associated with said body and being movable between a first position wherein said plunger extends into said body bore and a second position wherein said plunger is withdrawn from said body bore, said cylindrical plunger having a plunger outside diameter;
   a spherical releasing ball located above and initially engaging said plunger when said plunger is in its said first position, said ball having a ball diameter greater than one-half of a difference between said inside diameter of said body bore and said plunger outside diameter so that when said plunger is in its said first position, said ball is prevented from moving downward through said body bore past said plunger, and so that when said plunger is withdrawn to its said second position said ball is permitted to drop through said body bore;
   a second cylindrical release plunger located above said ball, said second plunger being movable between a first position wherein it extends into said body bore and a second position wherein said second plunger is withdrawn from said body bore; and
   an elongated releasing dart initially located above and engaging said second plunger.

2. The apparatus of claim 1, further comprising:
   a lifting sub connected to an upper end of said container body, said lifting sub having a loading bore defined therethrough and communicated with said body bore, said loading bore having a diameter large enough that said releasing ball and said releasing dart can pass therethrough.

3. The apparatus of claim 2, further comprising:
   a cap detachably connected to an upper end of said lifting sub for closing said loading bore, said cap having a rod extending downward therefrom through said loading bore.

4. The apparatus of claim 2, wherein:
   said upper end of said container body has a first thread for direct connection to said lifting sub, and a lower end of said container body has a second thread complementary to said first thread so a plurality of said container bodies can be stacked.

5. The apparatus of claim 4, further comprising:
   a swivel connected to said second thread of said lower end of said container body.

6. The apparatus of claim 4, wherein:
   said first and second threads are straight threads; and
   said apparatus includes first and second O-ring seals adjacent said first and second threads.

7. The apparatus of claim 1, wherein:
   said first release plunger, when in its said first position, extends radially into said body bore a distance greater than a difference between said inside diameter and said ball diameter.

8. A cementing head apparatus, comprising:
   a container body having upper and lower ends with a body bore extending therethrough from said upper end to said lower end, said container body having a first straight thread and a first O-ring seal at said upper end and having a second straight thread and a second O-ring seal at said lower end;
   a lifting sub directly connected to said upper end of said body at said first thread, with said first O-ring seal sealing between said lifting sub and said body, said lifting sub having a loading bore therethrough communicated with said body bore;
   a cap closing an upper end of said loading bore of said lifting sub;
   a swivel directly connected to said lower end of said body at said second thread with said second O-ring seal sealing between said body and said swivel;
   upper and lower release plungers extending into said body bore;
   a releasing ball resting on said lower release plunger; and
   a releasing dart resting on said upper release plunger.

9. The apparatus of claim 8, wherein:
   said first and second threads are complementary so that a plurality of said container bodies can be stacked together with said lifting sub being directly connected to an uppermost one of said container bodies and with said swivel being directly connected to a lowermost one of said container bodies.

10. The apparatus of claim 8, further comprising:
    a loading rod means extending down from said cap for pushing said dart through said loading bore into said body bore.

11. A swivel for use with a well, comprising:
    a swivel body including:
       an upper body portion having a body flow passage defined therethrough, and having a downward facing first counterbore adjacent said flow passage; and
       a lower body portion connected to said upper body portion so that a body cavity is defined between said upper and lower body portions, said lower body portion having a lower opening defined therethrough;

a swivel mandrel extending through said lower opening of said lower body portion and having an enlarged diameter mandrel shoulder received in said body cavity, said mandrel having an upper and closely received within said first counterbore of said upper body portion, said swivel mandrel having a mandrel flow passage defined therethrough and communicated with said body flow passage;

bearing means disposed in said body cavity between said swivel body and said swivel mandrel;

first and second seal means, disposed between said upper body portion and said upper end of said swivel mandrel, for sealing between said body cavity and said flow passages and for preventing contamination of an oil lubricating bath in said body cavity by fluids in said flow passages;

an inspection passage means defined in said upper body portion, for detecting failure of either of said first and second seal means;

wherein said upper body portion includes a second counterbore adjacent and below said first counterbore;

wherein said upper end of said swivel mandrel includes a first portion closely received in said first counterbore and an enlarged diameter second portion closely received in said second counterbore;

wherein said first seal means between said first counterbore and said first portion of said upper end of said swivel mandrel;

wherein said second seal means seals between said second counterbore and said second portion of said upper end of said swivel mandrel; and wherein said inspection passage means communicates with one of said first and second counterbores between said first and second seal means.

12. The swivel of claim 11, wherein:
said first and second seal means are mechanical spring energized seals.

13. A cementing head apparatus, comprising:
a container body having a generally cylindrical body bore defined therethrough, said body bore having an inside diameter;
a first cylindrical release plunger operably associated with said body and being movable between a first position wherein said plunger extends into said body bore and a second position wherein said plunger is withdrawn from said body bore, said cylindrical plunger having a plunger outside diameter;
a spherical releasing ball located above and initially engaging said plunger when said plunger is in its said first position, said ball having a ball diameter greater than one-half of a difference between said inside diameter of said body bore and said plunger outside diameter so that when said plunger is in its said first position, said ball is prevented from moving downward through said body bore past said plunger, and so that when said plunger is withdrawn to its said second position said ball is permitted to drop through said body bore; and
upper and lower cementing lines connected to said container body by hammer unions welded to said container body.

14. A swivel for use with a well, comprising:
a swivel body including:

an upper body portion having a body flow passage defined therethrough, and having a downward facing first counterbore adjacent said flow passage; and a lower body portion connected to said upper body portion so that a body cavity is defined between said upper and lower body portions, said lower body portion having a lower opening defined therethrough;

a swivel mandrel extending through said lower opening of said lower body portion and having an enlarged diameter mandrel shoulder received in said body cavity, said mandrel having an upper end closely received within said first counterbore of said upper body portion, said swivel mandrel having a mandrel flow passage defined therethrough and communicated with said body flow passage;

bearing means disposed in said body cavity between said swivel body and said swivel mandrel;

first and second seal means, disposed between said upper body portion and said upper end of said swivel mandrel, for sealing between said body cavity and said flow passages and for preventing contamination of an oil lubricating bath in said body cavity by fluids in said flow passages;

an inspection passage means defined in said upper body portion, for detecting failure of either of said first and second seal means; and wherein said bearing means further comprises:
an upper thrust bearing between said upper end of said swivel mandrel and said upper body portion;
a lower thrust bearing between said mandrel shoulder and said lower body portion; and
an alignment bearing between said swivel mandrel and said lower body portion.

15. A swivel for use with a well, comprising:
a swivel body including:
an upper body portion having a body flow passage defined therethrough, and having a downward facing first counterbore adjacent said flow passage; and
a lower body portion connected to said upper body portion so that a body cavity is defined between said upper and lower body portions, said lower body portion having a lower opening defined therethrough;
a swivel mandrel extending through said lower opening of said lower body portion and having an enlarged diameter mandrel shoulder received in said body cavity, said mandrel having an upper end closely received within said first counterbore of said upper body portion, said swivel mandrel having a mandrel flow passage defined therethrough and communicated with said body flow passage;
bearing means disposed in said body cavity between said swivel body and said swivel mandrel;
first and second seal means, disposed between said upper body portion and said upper end of said swivel mandrel, for sealing between said body cavity and said flow passages and for preventing contamination of an oil lubricating bath in said body cavity by fluids in said flow passages;
an inspection passage means defined in said upper body portion, for detecting failure of either of said first and second seal means;
wherein said upper and lower body portions are threadedly connected together; and wherein said swivel further includes locking means for locking said upper and lower body portions together after they are threadedly connected.

16. A swivel for use with a well, comprising:

a swivel body including:
- an upper body portion having a body flow passage defined therethrough, and having a downward facing first counterbore adjacent said flow passage; and
- a lower body portion connected to said upper body portion so that a body cavity is defined between said upper and lower body portions, said lower body portion having a lower opening defined therethrough;

a swivel mandrel extending through said lower opening of said lower body portion and having an enlarged diameter mandrel shoulder received in said body cavity, said mandrel having an upper end closely received within said first counterbore of said upper body portion, said swivel mandrel having a mandrel flow passage defined therethrough and communicated said body flow passage;

bearing means disposed in said body cavity between said swivel body and said swivel mandrel;

first and second seal means, disposed between said upper body portion and said upper end of said swivel mandrel, for sealing between said body cavity and said flow passages and for preventing contamination of an oil lubricating bath in said body cavity by fluids in said flow passages;

an inspection passage means defined in said upper body portion, for detecting failure of either of said first and second seal means;

wherein said upper body portion has a first straight thread defined on an upper end thereof; and wherein said swivel mandrel has a second straight thread defined on a lower end thereof, said first and second threads being complementary.

* * * * *

UNITED STATES PATENT AND TRADEMARK OFFICE
CERTIFICATE OF CORRECTION

PATENT NO. : 4,995,457
DATED : February 26, 1991
INVENTOR(S) : Morris G. Baldridge It is certified that error appears in the above-indentified patent and that said Letters Patent is hereby corrected as shown below:

In column 11, line 6, delete the word [and] and insert --end--.

Signed and Sealed this

Sixteenth Day of August, 1994

Attest:

BRUCE LEHMAN

Attesting Officer   Commissioner of Patents and Trademarks